May 4, 1926.
A. F. MASURY ET AL
1,583,301
CUSHION CONNECTION FOR VEHICLE CONSTRUCTION
Filed July 15, 1924    3 Sheets-Sheet 1
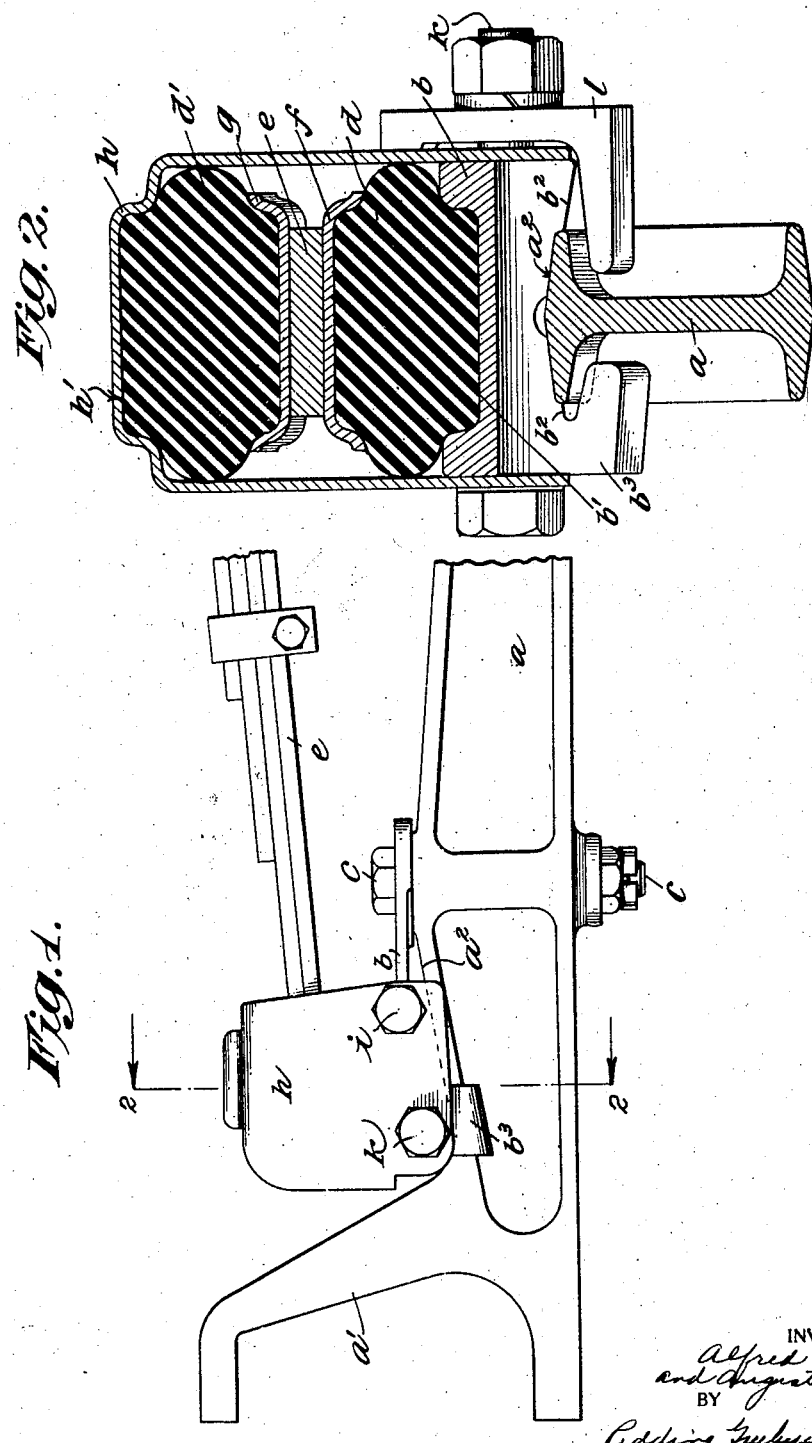

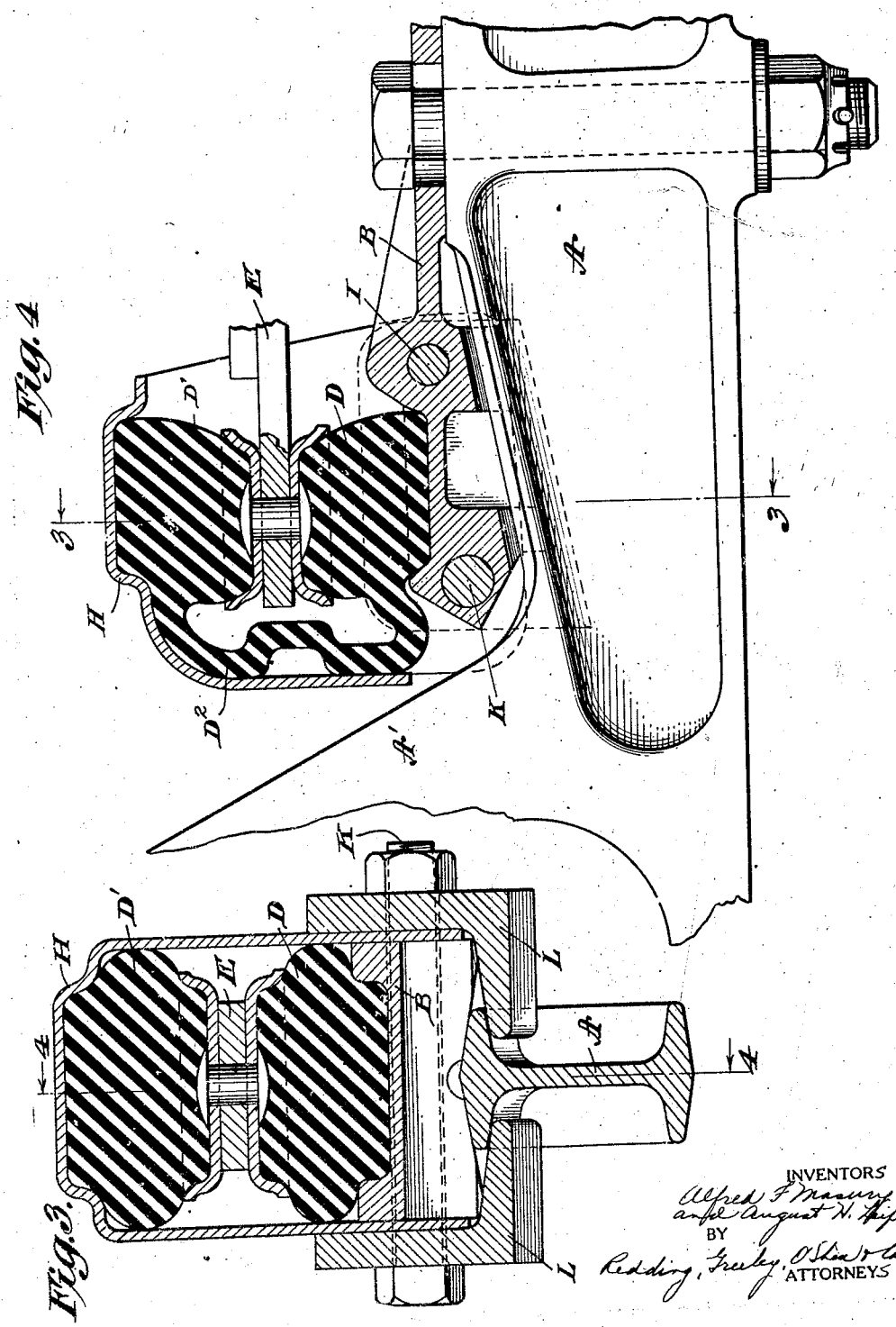

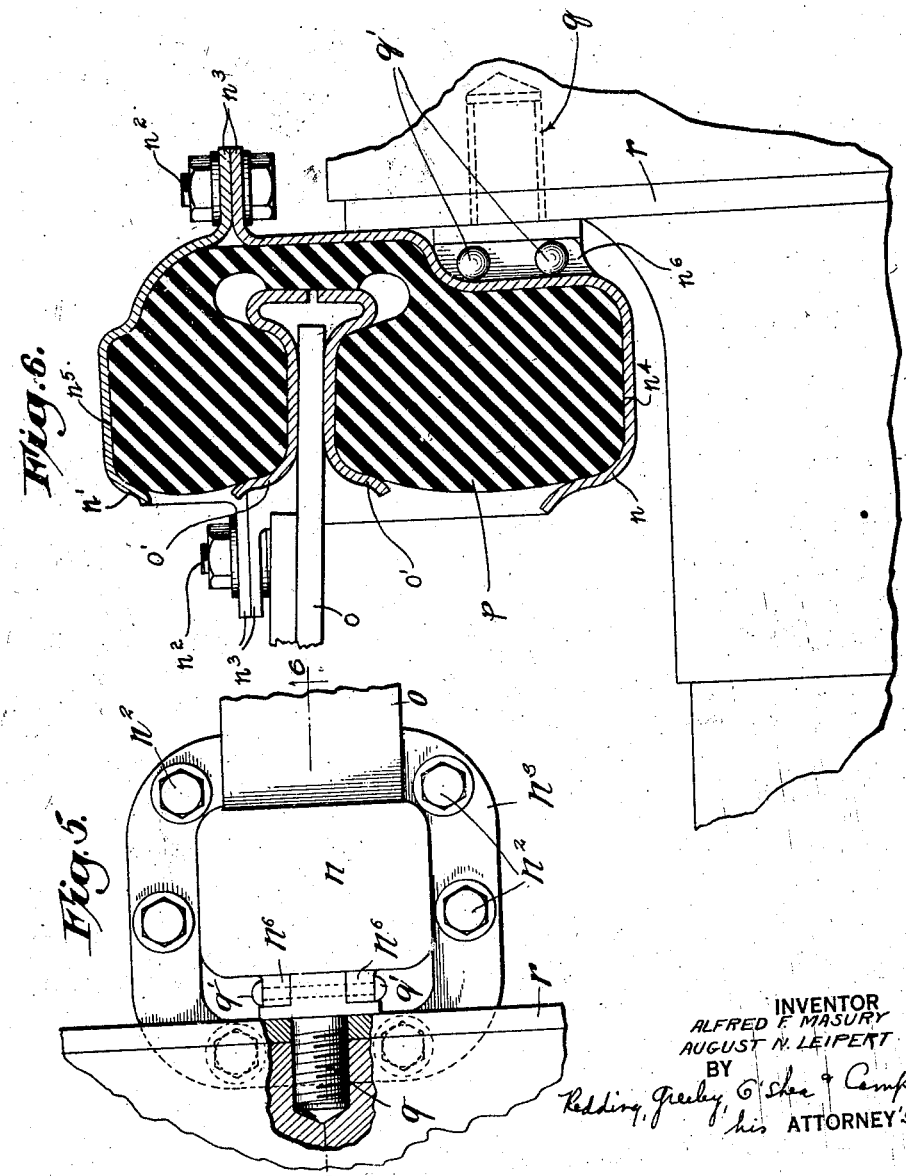

Patented May 4, 1926.

1,583,301

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

CUSHION CONNECTION FOR VEHICLE CONSTRUCTION.

Application filed July 15, 1924. Serial No. 726,081.

*To all whom it may concern:*

Be it known that we, ALFRED F. MASURY and AUGUST H. LEIPERT, citizens of the United States, respectively, residing in the borough of Manhattan and in the borough of Queens, in the city of New York, in the State of New York, respectively, have invented certain new and useful Improvements in Cushion Connections for Vehicle Construction, of which the following is a specification, reference being had to the accompanying drawings, forming a part hereof.

This invention relates to non-metallic cushion connections for vehicles springs and is concerned primarily with a construction used in connection with springs which are disposed at a substantial angle to the line of movement of the vehicle as exemplified, for instance, in the suspension on Ford cars in which the front and rear springs extend transversely. In such constructions where the ends of the springs are rigidly connected to the axle or equivalent part and the center of the spring is attached to the body frame or the equivalent, the spring itself is subjected to extreme tortion during starting and stopping of the car. This tortion imposes a well defined limit on the practical length of the spring. Shortening the spring impairs the riding qualities while keeping it long subjects the parts to excessive noise, wear and breakage. By the present invention it is sought to provide a non-metallic yielding connection at the ends of the springs of the type described (or at their mid section) which will not only eliminate noise, wear and lubrication but will function in such manner as to relieve the spring of the extreme tortional stresses to which it would otherwise be subjected. The improved connection itself has properties tending to improve the riding qualities but, perhaps, its mechanical attributes are most important in cushioning the tortional stresses to a degree which permits the spring to be made of maximum length and corresponding resiliency. For convenience in this application such connections have been shown in one simple form as applied to Ford cars but it will be apparent to one skilled in the art as the description proceeds that the principle may be employed to advantage in other types of suspension and details considerably changed to meet requirements of particular situations. In the drawings:

Figure 1 is a fragmentary view in front elevation showing one end of the front spring of a Ford car connected to the axle by the improved devices.

Figure 2 is a view in transverse section through the housing shown in Figure 1 and taken on the plane indicated by the line 2—2 of Figure 1 and looking in the direction of the arrows.

Figure 3 is a view in transverse section through the modified construction shown in Figure 4 and taken on the plane indicated by the line 3—3 of Figure 4 and looking in the direction of the arrows.

Figure 4 is a longitudinal sectional view through the housing shown in Figure 3 taken on the plane indicated by the line 4—4 of Figure 3 and looking in the direction of the arrows.

Figure 5 is a fragmentary view in plan showing the application of the improved connection to the rear spring of a Ford car.

Figure 6 is a view in cross section taken on the plane indicated by the line 6—6 of Figure 5 and looking in the direction of the arrows.

In accordance with accepted practice both the front and rear springs of a Ford car extend transversely of the body being connected rigidly at their mid points to the body and at their ends to the respective axles, as by shackles. The noise, wear and breakage on both the springs and shackles are well recognized. When the car starts and stops tortional stresses are imposed on the springs and connections. It is not uncommon, for instance, for the front axle itself to tend to turn under. These stresses are such that the springs ordinarily are not made as long as they otherwise would be for greatest riding comfort. The principle underlying the present invention is the connection of such springs by non-metallic yielding material adapted to function to absorb some of these stresses and yet constitute a perfectly adequate mechanical connection requiring no lubrication, subject to little wear, free from noise, and possessing incidentally, some degree of inherent resiliency to improve the riding qualities. With such connections the vehicle springs may be made longer than otherwise.

In the simplest form of adaptation advantage is taken of the structural characteristics of the standard Ford axle indicated at $a$. On this axle is supported, adjacent to the fork $a'$ a plate $b$ which may rest directly on the axle and be secured thereto by a through bolt $c$ passing through one end of the plate and through the shackle bolt hole provided in Ford axles. The plate $b$ is preferably of such configuration as to rest on the inclined surface $a^2$ of the axle adjacent to the fork $a'$ and present an upper surface which extends in substantially a horizontal plane. As illustrated in Figure 2 the plate $b$ which may be forged has reversely tapered surfaces $b^2$ adapted to rest on the upper reversely tapered surface of the axle $a$. One side of the plate may be extended downwardly and inwardly to form a lug $b^3$ adapted to engage the undersurface of the axle $a$ which, in standard practice is an I-beam. This relation serves to center the plate $b$ on the axle and hold it against lateral displacement or movement about the bolt $c$, in one direction. The upper surface is preferably formed with a seat $b'$ for a block $d$ of non-metallic yielding material such as rubber. The end of the spring $e$ carries suitable seats $f$, $g$, shown, respectively, on the under and upper surfaces thereof, the seat $f$ being opposed to the seat $b'$ and the seat $g$ receiving another block $d'$ of non-metallic yielding material such as rubber. A housing $h$ of pressed metal or other suitable form receives the end of the spring $e$ and the blocks $d$, $d'$, this housing at its upper end being formed with a seat $h'$ opposed to the seat $g$ to retain the front block $d'$ against displacement. The front and rear sides of the housing $h$ are formed with aligned openings to receive bolts $i$, $k$, which pass through these walls and through bolt holes in the forging $b$. One of these bolts $k$ secures in place a retaining clip $l$ which extends into engagement with the axle $a$, co-operating with the lug $b^3$ at the opposite side of the axle to secure the plate and the associated connections positively on the axle against displacement. In assembling the connections the housing $h$ is forced down to compress yielding blocks $d$, $d'$ so that when the retaining bolts $i$, $k$, are finally passed through the sides of the housing these blocks are retained under substantial compression. Elongation of the spring $e$ is permitted by the yield of the non-metallic material which may flow within the confines of the housing $h$. No metal to metal contact is involved. Referring now to Figure 2 it will be evident that tortion of the spring $e$ will be resisted yieldingly by the blocks $d$, $d'$ and some of the tortional stress absorbed by the material so that the spring itself is protected against injury. The tendency of the spring $e$ to be moved forwardly or rearwardly with respect to the axle $a$ in starting or stopping is also resisted yieldingly by the blocks $d$, $d'$.

The modification shown in Figures 3 and 4 does not differ materially from that heretofore described except that the plate B is not formed with an integral lug to co-operate with the axle A but the housing H with the plate and all other elements of the assembly are clamped to the axle and held against displacement by clips L at opposite sides of the axle secured in place by the through bolts K. Similar clips may be secured by the other through bolt I. Figure 4 shows the relation of the end of the plate B to the fork A' to afford sufficient clearance for assembly on any standard axles regardless of variations in the dimensions and finish. Figure 4 also shows a web of non-metallic yielding material $D^2$ which is moulded with the lower and upper blocks D, D', respectively, this web being so disposed with relation to the end of the spring E as to cushion its movements yieldingly upon elongation thereof.

Figures 5 and 6 show the application of the improvements to a transverse spring whose ends are to be connected to some other member than the axle itself, as is the condition with the rear spring of a Ford automobile. In this assembly a two-part housing $n$, $n'$ may receive the end of the transverse spring $o$ and the non-metallic yielding material $p$ with which the spring is engaged. The sections of the housing may be united by suitable bolts $n^2$ passing through engaging flanges $n^3$. The seats $o'$ for the sections of material may be carried on the upper and lower sides of the spring and complementary seats therefor formed, respectively, at $n^4$, $n^5$, within the housing sections $n$, $n'$. The housing thus formed may be mounted on the running gear in any approved way but to adapt it to standard construction there is illustrated a threaded stud $q$ carried by some fixed part such as the brake flange $r$, the stud $q$ being united to the housing as by means of suitable pins $q'$ passing through the head of the stud and through lugs $n^6$ formed on the outer wall of the housing. In this construction it is preferred to assemble the non-metallic yielding material $p$ under compression within the housing. The characteristics described with reference to the front spring connection are to be found in the embodiment shown in Figures 5 and 6.

As pointed out hereinbefore, the improved connection is applicable to situations where the spring or similar part extends angularly to the direction of travel of the vehicle and may, in its mechanical details, be varied without departing from the principle.

What we claim is:

1. In a motor vehicle, in combination with the axle, a spring extending generally transverse to the direction of travel of the vehicle, a connection and support between the end of the spring and the axle comprising non-metallic yielding material engaged with the end of the spring, a housing to confine said non-metallic yielding material, and means to engage the axle and the housing to maintain the material against displacement to resist yieldingly axial twist of the spring.

2. In a motor vehicle, in combination with the axle, a spring extending generally transverse to the direction of travel of the vehicle, a connection and support between the end of the spring and the axle comprising non-metallic yielding material engaged with the end of the spring, a housing to confine said non-metallic yielding material, and means to engage the axle and the housing to maintain the material under compression against displacement to resist yieldingly axial twist of the spring.

3. In a motor vehicle, in combination with the axle, a spring extending generally transverse to the direction of travel of the vehicle, a connection and support between the end of the spring and the axle comprising non-metallic yielding material into which the end of the spring extends, seats for the non-metallic material carried on the end of the spring to hold the material against relative displacement with respect thereto, a housing to confine said material on said seats, and means to engage the axle and the housing to maintain the material against displacement to resist yieldingly axial twist of the spring.

4. In a motor vehicle, in combination with an axle and a suspension spring extending substantially in parallelism therewith, a connection and support between the end of the spring and the axle including non-metallic yielding material engaged with the end of the spring, a plate secured to the axle and formed with a seat for said non-metallic yielding material, and means to clamp the material to the seat against displacement with respect to the axle.

5. In a motor vehicle, in combination with an axle and suspension spring extending substantially parallel thereto, a connection between the end of the spring and axle including non-metallic yielding material engaged with the end of the spring, a housing to support the non-metallic yielding material, and clips co-operating with the housing and the axle to secure the housing against movement with respect thereto.

6. In a motor vehicle, in combination with the axle and a suspension spring extending substantially parallel thereto, a connection between the ends of the spring and the axle, including non-metallic yielding material engaged with the end of the spring, a plate on which said material seats supported on the axle, a housing to confine the material, and through bolts passing through the housing and the plate to secure the two together and confine the material under compression.

7. In a motor vehicle, in combination with the axle and a suspension spring extending substantially parallel thereto, a connection between the ends of the spring and the axle, including non-metallic yielding material engaged with the end of the spring, a plate on which said material seats supported on the axle, a housing to confine the material, through bolts passing through the housing and the plate to secure the two together and confine the material under compression and clips carried with the bolts to engage the axle and secure the plate against movement thereon.

This specification signed this 10th day of July, A. D. 1924.

AUGUST H. LEIPERT.
ALFRED F. MASURY.